US009648313B1

(12) United States Patent
Henry et al.

(10) Patent No.: US 9,648,313 B1
(45) Date of Patent: May 9, 2017

(54) AVIATION DISPLAY SYSTEM AND METHOD

(71) Applicant: Rockwell Collins, Inc., Cedar Rapids, IA (US)

(72) Inventors: Daniel J. Henry, Cedar Rapids, IA (US); Matthew J. Cunnien, Marion, IA (US); Michael J. Armstrong, Central City, IA (US); Peter J. Flugstad, Marion, IA (US); Shawn M. Spencer, Richardson, TX (US); Thomas Schnell, Iowa City, IA (US); Donald E. Glass, Mukilteo, WA (US); Max G. Taylor, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 195 days.

(21) Appl. No.: 14/644,284

(22) Filed: Mar. 11, 2015

Related U.S. Application Data

(60) Provisional application No. 61/951,050, filed on Mar. 11, 2014.

(51) Int. Cl.
| | |
|---|---|
| *H04N 13/02* | (2006.01) |
| *G06F 3/01* | (2006.01) |
| *G02B 27/01* | (2006.01) |
| *B64D 45/00* | (2006.01) |
| *H04N 13/04* | (2006.01) |

(52) U.S. Cl.
CPC .......... *H04N 13/044* (2013.01); *B64D 45/00* (2013.01); *G02B 27/0101* (2013.01); *G02B 27/0172* (2013.01); *G06F 3/012* (2013.01); *G06F 3/013* (2013.01); *G02B 2027/014* (2013.01); *G02B 2027/0134* (2013.01); *G02B 2027/0138* (2013.01); *G02B 2027/0145* (2013.01)

(58) Field of Classification Search
None
See application file for complete search history.

(56) References Cited

U.S. PATENT DOCUMENTS

| | | | |
|---|---|---|---|
| 9,308,439 B2 * | 4/2016 | Aoki | A63F 13/00 |
| 2010/0322479 A1 * | 12/2010 | Cleveland | G06F 3/012 382/103 |
| 2012/0057006 A1 * | 3/2012 | Joseph | H04N 13/0495 348/59 |

(Continued)

*Primary Examiner* — Reza Aghevli
(74) *Attorney, Agent, or Firm* — Angel N. Gerdzhikov; Donna P. Suchy; Daniel M. Barbieri

(57) ABSTRACT

An aviation display system includes an input source configured to provide a left eye input channel including a first band and an input source configured to provide a right eye input channel having a second band different from the first band. A processor is coupled with the input sources and with a non-transitory processor readable medium storing processor executable code, which causes the processor to receive data indicative of the left eye and right eye input channels from the input sources and to generate a left eye output channel and a right eye output channel. A display is configured to receive the left and right eye output channels from the processor and to provide an image indicative of the left eye output channel to a left eye of a user, and an image indicative of the right eye output channel to a right eye of the user.

18 Claims, 11 Drawing Sheets

(56) References Cited

U.S. PATENT DOCUMENTS

| | | | |
|---|---|---|---|
| 2012/0188637 A1* | 7/2012 | Joseph | G02B 27/2278 359/478 |
| 2013/0033575 A1* | 2/2013 | Kobayashi | G02B 27/26 348/46 |
| 2013/0088489 A1* | 4/2013 | Schmeitz | H04N 5/2254 345/419 |
| 2013/0150093 A1* | 6/2013 | Seol | H04N 5/232 455/457 |
| 2013/0300728 A1* | 11/2013 | Reichow | G09G 3/36 345/419 |
| 2015/0062305 A1* | 3/2015 | Murayama | G01B 11/043 348/48 |
| 2015/0085086 A1* | 3/2015 | Marchand | G06T 15/20 348/51 |
| 2015/0228102 A1* | 8/2015 | Grossman | H04N 13/0033 345/427 |
| 2015/0312561 A1* | 10/2015 | Hoof | G02B 27/0172 348/46 |

\* cited by examiner

AVIATION DISPLAY SYSTEM AND METHOD

CROSS-REFERENCE TO RELATED APPLICATIONS AND INCORPORATION BY REFERENCE

This application claims priority to U.S. Provisional application Ser. No. 61/951,050, titled Aviation And Defense Display Systems, filed on Mar. 11, 2014, the entire content of which is hereby expressly incorporated herein by reference.

BACKGROUND

Three-dimensional (3D) video images for consumer television and other applications have become widespread. The hardware for 3D video images is well-known and typically involves substantially identical left and right video image channels of the same scene, except that the two image channels are taken from different lateral positions often separated by a few inches, yielding slightly different images so as to mimic views from each of a person's eyes. Both video image channels are typically sent to a 3D processor where they are electronically converted into 3D display drive signals for a 3D display device, such as a 3D flat screen television. Viewers usually look at the 3D display via special glasses or Fresnel lenses, which allow each video image channel to effectively reach one eye only, which projects two slightly different images onto the retinas of the viewer's eyes. The viewer's visual cortex processes the binocular disparities of the two slightly different images together in a way that permits 3D, or stereoscopic depth perception. Many variations of the systems and methods of this general 3D system, the 3D processor, Fresnel lenses, and the special glasses, are known in the industry and need not be explained to a person skilled in the art.

SUMMARY

In one aspect, embodiments of the inventive concepts disclosed herein are directed to an aviation display system. The system includes a first input source configured to provide a left eye input channel having a first band, and a second input source configured to provide a right eye input channel having a second band different from the first band. A processor is coupled with the first and second input channels and with a non-transitory processor readable medium storing processor executable code. The processor-executable code when executed by the processor, causes the processor to receive data indicative of the left eye input channel from the first input source and data indicative of the right eye input channel from the second input source and to process the received data to generate a left eye output channel and a right eye output channel. A display is coupled with the processor and is configured to receive the left eye output channel and the right eye output channel from the processor and to provide an image indicative of the left eye output channel to a left eye of a user and an image indicative of the right eye output channel to a right eye of the user.

In a further aspect, embodiments of the inventive concepts disclosed herein are directed to a method of displaying information. The method may include receiving, by a processor executing processor executable code stored in a non-transitory processor-readable medium, a left eye input channel including a first band from a first input source and a right eye input channel including a second band different from the first band from a second input source. The method may also include processing, by the processor, the received data to generate a left eye output channel and a right eye output channel. The method may further include providing, by the processor, the left eye output channel and the right eye output channel to a display configured to provide at least one image indicative of the left eye output channel to a left eye of a user, and at least one image indicative of the right eye output channel to a right eye of the user.

BRIEF DESCRIPTION OF THE DRAWINGS

Like reference numerals in the figures may represent and refer to the same or similar element, feature, step, or function. Implementations of the inventive concepts disclosed herein may be better understood when consideration is given to the following detailed description. Such description makes reference to the annexed pictorial illustrations, schematics, graphs, drawings, and appendices, which are not necessarily to scale, and in which some features may be exaggerated and some features may be omitted or may be represented schematically or symbolically in the interest of clarity. In the drawings.

DETAILED DESCRIPTION

Figure 1:
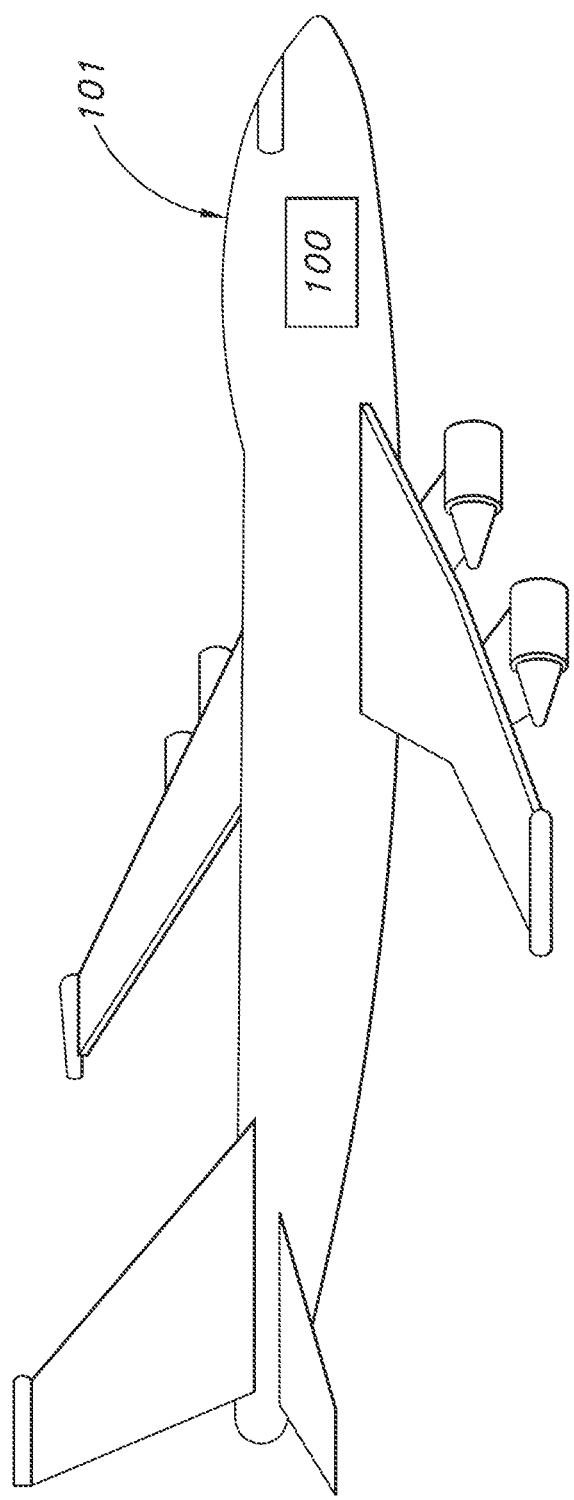
FIG. 1 is a diagram of an aviation display system deployed in an aircraft according to an exemplary embodiment of the inventive concepts disclosed herein.

Before explaining exemplary embodiments of the inventive concepts disclosed herein in detail, it is to be understood that the inventive concepts are not limited in their application to the details of construction and the arrangement of the components or steps set forth in the following description or illustrated in the drawings. In the following detailed description of exemplary embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, "or" refers to an inclusive or and not to an exclusive or, unless expressly stated to the contrary. For example, a condition A or B is satisfied by any one of the following: A is true (or present) and B is false (or not present), A is false (or not present) and B is true (or present), and both A and B are true (or present). In addition, use of the "a" or "an" are employed to describe elements, steps, and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "some embodiments," "one embodiment," or "an embodiment" means that a particular element, feature, structure, step, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features described herein, or any combination of sub-combination of two or more such features, along with other features which may not necessarily be described or be inherently present in the instant disclosure.

Broadly, embodiments of the inventive concepts disclosed herein are directed to aviation display systems and methods for providing additional information and increased situational awareness to users by providing different inputs to each eye of the user.

Figure 2:
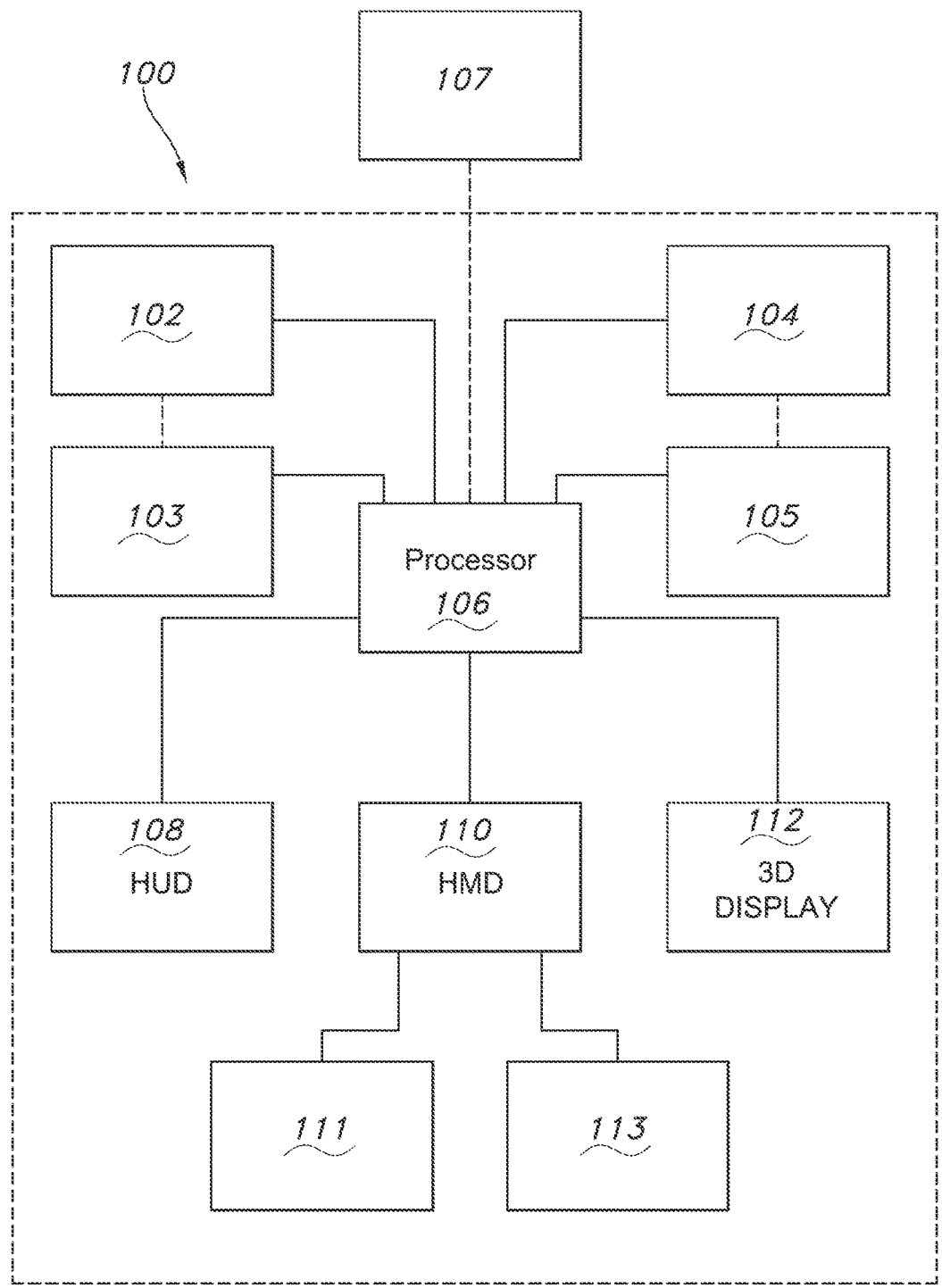
FIG. 2 is a diagram of the aviation display system of FIG. 1.

Referring now to FIGS. 1-2, an exemplary embodiment of an aviation display system 100 according to the inventive concepts disclosed herein is shown deployed on an aircraft 101. While the aircraft 101 is depicted in FIG. 1 as an airplane, system 100 may be deployed on a rotary wing aircraft, an unmanned aerial vehicle, or a ground-based station (mobile or stationary) in some embodiments. Further, implementations of aviation display systems according to the inventive concepts disclosed herein are not limited to aviation, and may be implemented in military, medical, surgical, or other applications as will be appreciated by persons of ordinary skill in the art having the benefit of the instant disclosure.

The aviation display system 100 includes a left eye input source 102, a synthetic vision system (SVS) application 103, a right eye input source 104, a point cloud vision system (PCVS) application 105, a processor 106, a heads-up display (HUD) 108, a head-mounted display (HMD) 110, and a 3D display 112. In some embodiments, one or more of the HUD 108, the HMD 110, and the 3D display 112 may be omitted, or multiple HUDs 108, HMDs 110, and 3D displays 112 may be implemented.

The left eye input source 102 is coupled with the processor 106 such that the left eye input source 102 and the processor 106 may exchange data and/or signals with one another. The left eye input source 102 is arbitrarily designated as providing a left eye input channel and may be implemented as an ultraviolet camera, a visible light camera, a video camera, an infrared sensor, a RADAR, a LADAR, a synthetic vision system (SVS), a Point Cloud Vision System (PCVS), sensors of other wavebands, or combinations thereof.

The left eye input source 102 is configured to provide images or video indicative of live or synthetically rendered view of an environment or external scene about the aircraft 101. The left eye input source 102 may be configured to provide data indicative of a left eye input channel to the processor 106, which data may include a single band, different bands, or a fused combination of bands. The left eye input source 102 may further be configured to provide images or video from a known perspective, or viewpoint relative to the external scene about the aircraft 101 to the processor 106. In some embodiments, the perspective of the left eye input source 102 may be monoscopic, or may be a left half of a stereoscopic pair (e.g., with fixed or variable eye separation including standard eye separation, hyperstereo, or ultrahyperstereo). For example, a typical or standard eye separation may have an Inter Pupillary Distance (IPD) of about 2.5 inches, a hyperstereo eye separation may have an IPD of more than 2.5 inches, but less than 25 inches, and an ultrahyperstereo eye separation may have an IPD of more than 25 inches.

The right eye input source 104 may be implemented similarly to the left eye input source 102, or may be different from the left eye input source 102. The right eye input source 104 is arbitrarily designated as providing right eye input channel, and is coupled with the processor 106 such that the processor 106 and the right eye input source 104 exchange signals and/or data with one another. The right eye input source 104 may be configured to capture and/or provide data indicative of a right eye input channel images or video, which may include a single band, different bands, or a fused combination of bands, which may be different from, similar to, dissimilar with, or partially overlapping with the band of fused combination of bands provided by the left eye input source 102.

The right eye input source 104 may further be configured to provide images or video from a viewpoint which may be the same as the known viewpoint or perspective of the left eye input source 102, or different therefrom. In some embodiments the perspective of the right eye input source 104 may be monoscopic, or may be the right half of a stereoscopic pair in combination with the left eye input source 102 (e.g., fixed or variable including standard eye separation, hyperstereo, or ultrahyperstereo).

The left eye input source 102 and the right eye input source 104 may include variable sensors or image or video sources, which may have variable location, angular orientation, power levels, and sensitivity levels. In some embodiments, the left eye input source 102 may be configured to provide data indicative of images or video with a first band (B1), and the right eye input source 104 may be configured to provide data indicative of images or video with a second band (B2) which may be different from, and/or dissimilar with B1, such that the two bands fused together provide different image content combining the advantages (e.g., spatial, temporal, magnitude) of both bands B1 and B2. Further, in some embodiments where the left eye input source 102 may provide data from a first perspective P1 and the right eye input source 104 may provide data from a second perspective P2. Where P1 and P2 are the same, the resulting combined image may be a 2D image, and where P1 and P1 are different the resulting combined image may be presented to users as a 3D image as described below. Both the 2D and the 3D image may include similar bands, or dissimilar bands B1 and B2.

In some instances, the left eye input source 102 and the right eye input source 104 may be configured to provide different types of boresighted monoscopic images or video. For example, the left eye input source 102 may include the output from a video camera directed at an external scene outside the aircraft 101, and the right eye input source 104 may include the output of an infrared sensor directed toward the same external scene outside the aircraft 101 to provide a monoscopic video or image. In some embodiments, the left eye input source 102 may include the output from a video camera directed at an external scene outside the aircraft 101, and the right eye input source 104 may include the output of an infrared sensor directed toward the same external scene outside the aircraft 101 but from a different point of view to provide a stereoscopic video or image.

The SVS application 103, and the PCVS application 105 may be coupled with the processor 106, and/or with one or both of the left eye input source 102 and the right eye input source 104 so as to bi-directionally exchange signals and/or data. In some embodiments, the SVS application 103 and/or the PCVS application 105 may be implemented as software applications executed by the processor 106. In some embodiments, the SVS application 103 and/or the PCVS application 105 may be coupled with one or more remote data sources (e.g., via an Ethernet connection) as described below. It is to be understood that in some embodiments one or both of the SVS application 103 and the PCVS application 105 may be omitted.

The processor 106 may be implemented as a 3D processor and may be configured to execute processor-executable code stored in a non-transitory processor-readable medium to carry out the functionality describe herein. The processor 106 may be configured to receive data indicative of images or video of a left eye input channel from the left eye input source 102 and a right eye input channel from the right eye input source 104. In some embodiments, the processor 106 may be coupled with another source of left eye input channel and right eye input channel (e.g., the SVS application 103 and/or the PCVS application 105). The processor 106 is configured to process the left eye and right eye input channel and to provide left eye output channel and right eye output channel to one or more of the HUD 108, the HMD 110, and the 3D display 112. In some embodiments, the processor 106 may interlace the left eye input channel and the right eye input channel, and in some embodiments where one or more of the left and right eye input channels include multiple bands, the processor 106 may fuse one or more bands from the left eye input channel and the right eye input channel.

The HUD 108 may be implemented as a head-up display configured to be positioned in the field of view of a user and to present a 2D and/or a 3D image to the user. In some embodiments, the HUD 108 may be configured to interlace or otherwise process two or more image channels or inputs (e.g., the left eye output channel and the right eye output channel from the processor 106) and to provide an interlaced or combined image in a form perceivable by a user.

The HMD 110 may be implemented as a wearable display device and may include separate display devices or portions for each eye of a user. In some embodiments, the HMD 110 may be immersive (e.g., non-transparent), and in some embodiments, the HMD 110 may be transmissive (e.g., transparent). The HMD 110 may include a head tracker 111 configured to track a position of a user's head, and/or an eye tracker 113 configured to track the user's eyes. The HMD 110 may not interlace images or video and may be configured to provide a first image or video to the left eye of a user, and a second image or video to the right eye of the user.

In some embodiments, the head tracker 111 and/or eye tracker 113 may allow the processor 106 to update or vary an offset between the left eye output channel and the right eye output channel in real-time, based on where the user is looking to provide a continuous stereo image that conforms to the outside world. Without head tracking, proper line of sight orientation for the viewer's input video stream would be difficult. Without eye tracking, it may be difficult for a transparent visor to produce a stereo image in normal visual conditions since the convergence depth may be at a different depth than other features visible to the pilot. In DVE conditions (e.g., night, fog, snow, dust) an HMD 110 with a transparent visor does not require eye tracking to produce a usable stereo image and since outside depth cues are limited, hyper-stereo/ultra-hyper-stereo images can be used to provide better depth cueing for the pilot. In some embodiments, an immersive HMD 110 (non-transparent) can be used in conjunction with the SVS application 103 or PCVS application 105 to provide (e.g., transmit to a remote processor 107 as shown in FIG. 2) stereo images for non-pilot crew stations, Unmanned Air Systems (UAS) crew stations, and training applications.

The 3D display 112 may be implemented as a display device such as a flat panel head-down display (HDD) configured to receive two image or video channels or output from the processor 106 (e.g., left eye channel and right eye channel), and to interlace or otherwise process the image or video outputs to provide a stereo image in a form perceivable by a user. For example, images or video from the left eye output channel and the right eye output channel provided by the processor 106 may be combined (or interlaced) by the 3D display 112 and provided to a user. The user may use 3D glasses to separate the images or video so that each eye sees only images or video from the respective channel.

In operation, the aviation display system 100 may provide users a 2D or 3D multisource image or video via one or more of the HUD 108, the HMD 110, and the 3D display 112. A user's brain may receive, interpret, and fuse the images or video from the left eye output channel and the right eye output channel together into an understandable image or video. For example, where the user is provided with a multisource 2D image, the user may interpret the image or video much as if the user had the natural ability to see two or more bands of light (e.g., visible and infrared light). This may help improve the user's situational awareness, especially where the external scene includes objects with different thermal (or waveband-specific) properties from each other and the background. In some embodiments where a 2D image is provided to the user, the left eye output channel and the right eye output channel may be provided from the left eye input source 102 (e.g., a video camera) and the right eye input source 104 (e.g., an IR sensor) which are co-located so as to minimize spatial differences in the views to provide the 2D image. In some embodiments where a 3D multisource image is to be provided to the user, the left eye input source 102 and the right eye input source 104 may be offset relative to one another to provide two halves of a stereoscopic image pair as will be appreciated by a person of ordinary skill in the art having the benefit of the instant disclosure.

Referring now to FIGS. 3-6B, in some embodiments, the SVS application 103 and/or the PCVS application 105 may provide inputs to the processor 106. Each of the SVS application 103 and/or the PCVS application 105 inputs may be configured to provide a left eye input channel and a right eye input channel similarly to the left eye input source 102 and the right eye input source 104. The left eye view and the right eye view may be interlaced or otherwise appropriately combined by the processor 106 and may be presented to the user on the same display (e.g., the HUD 108 or the 3D display 112) or on independent displays (e.g., on the HMD 110).

Figure 3:
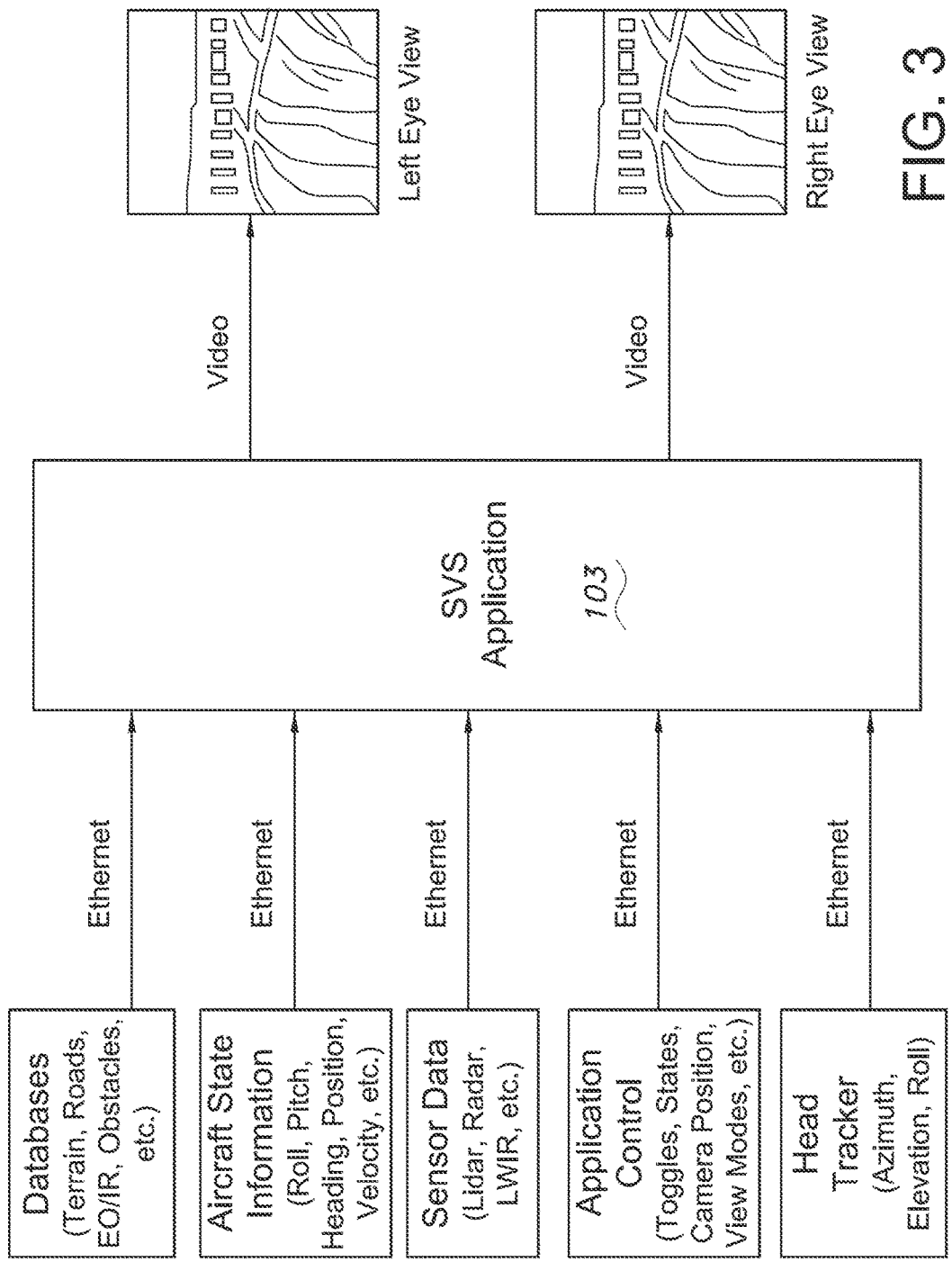
FIG. 3 is a diagram of an exemplary embodiment of a synthetic vision system according to the inventive concepts disclosed herein.

As shown in FIG. 3, the SVS application 103 may be implemented as a software application (e.g., executed by the processor 106 or by a separate processor) configured to render a 3D representation of the world in real time based on multiple databases (e.g., terrain, obstacles, roads, imagery) and live sensor inputs to provide a virtual view of the world for the user to increase situational awareness. The SVS application 103 may render multiple scenes (views) simultaneously based on the same database and sensor inputs simultaneously. Each scene may have its own camera that can be configured independently from the others.

Figure 4:
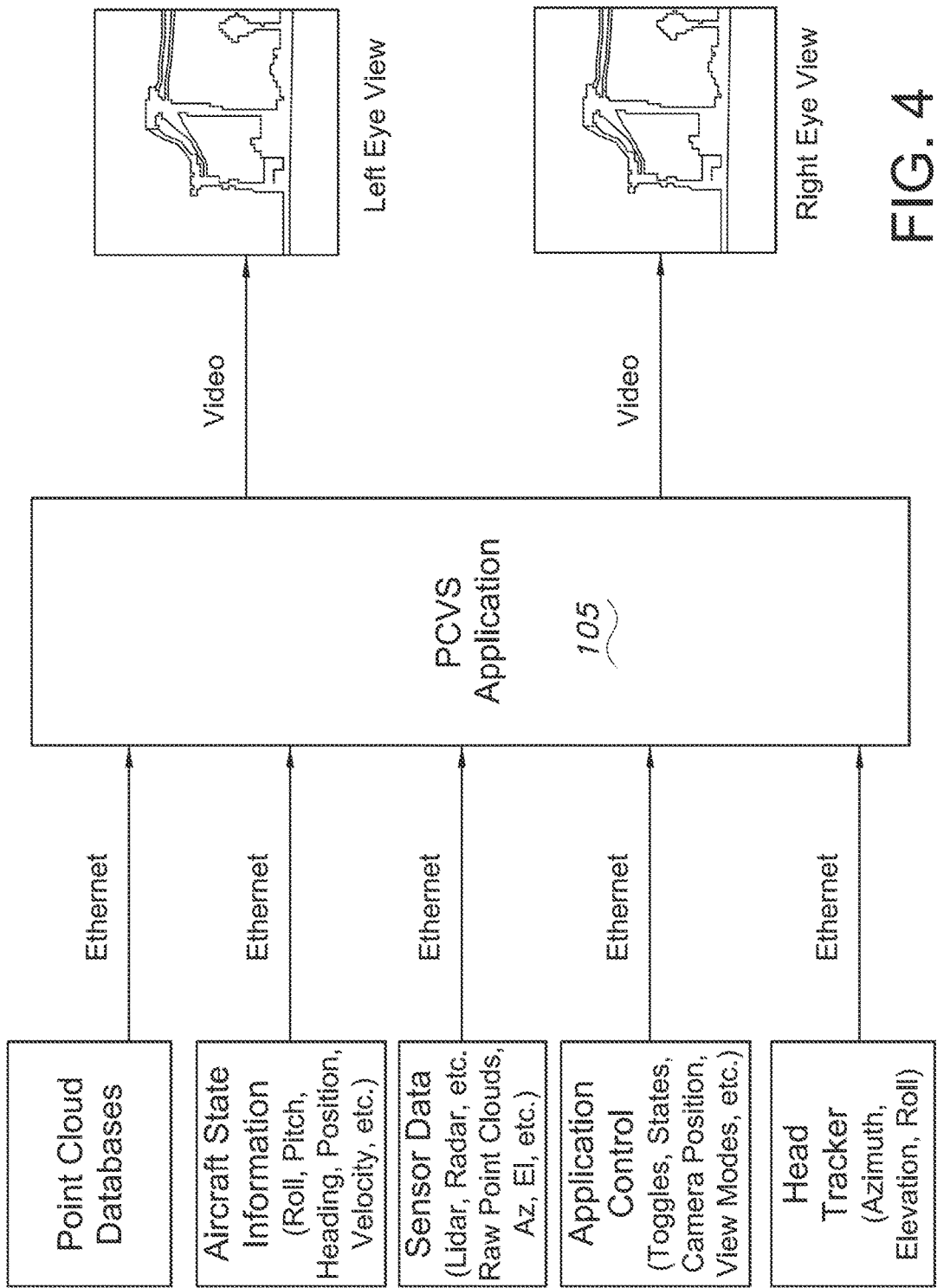
FIG. 4 is a diagram of an exemplary embodiment of a point cloud vision system according to the inventive concepts disclosed herein.

As shown in FIG. 4, the PCVS application 105 may be implemented as a software application (e.g., executed by the processor 106 or by a separate processor) configured to render point clouds in a 3D depiction from a database and/or from live sensor inputs and to provide a left eye channel output and/or a right eye channel output to the processor 106. As will be appreciated by persons of ordinary skill in the art, a point cloud is a set of data points in some coordinate system. In a three-dimensional coordinate system, these points are usually defined by X, Y, and Z coordinates, and often are intended to represent the external surface of an object. The PCVS application 105 may render multiple scenes (views) simultaneously based on the same point cloud data simultaneously. Each scene has its own camera that can be configured independently from the others. The PCVS application 105 camera can be aligned to correspond to the sensor Line of Sight (LOS) for real-time rendering or positioned anywhere in the scene for processed data. Because the PCVS application 105 is able to create multiple views with different camera positions a stereoscopic image can be created by offsetting the camera positions. For example, for a transparent HMD 110, the separation between the two cameras would be set to this and can be configurable per user to produce a display conformal to the real world when flying. In instances when the user is fully immersed in the scene, such as Degraded Visual Environments (DVE) or when using the 3D display 112, a hyper-stereoscopic/ultra-hyper-stereoscopic image may be presented to the user to help provide better depth judgment.

Additionally, the PCVS application 105 cameras can be configured real time which would allow the stereoscopic offsets to be changed based on phases of flight (e.g., takeoff, en-route, landing), speed, altitude, and environmental conditions. The PCVS application 105 can be configured to support stereoscopic 3D images on multiple types of displays, such as the HUD 108, the HMD 110, and the 3D display 112.

When implemented with the HMD 110, the PCVS application 105 may receive data from the head tracker and can provide full 360° coverage to the user. In some embodiments, where the HMD 110 has a transparent visor, an embedded eye tracker may provide data to the PCVS application 105. This allows the camera offsets to be updated real-time based on where the pilot is looking and provides a continuous stereo image that conforms to the outside world. Immersive HMDs 110 (non-transparent) can be used in conjunction with the PCVS application 105 to provide stereo images for non-pilot crew stations, Unmanned Air Systems (UAS) crew stations, and training applications. For an HMD 110, the PCVS application 105 may be configured to send the independent left eye and right eye camera views to separate displays for each eye with no need to interlace the images.

When implemented with the 3D display 112, the PCVS application 105 camera views would be interlaced or otherwise appropriately combined and presented to the pilot on the same displays instead of independent displays, as on an HMD 110. To view the image in stereo the pilot/user may use an appropriate viewing device (e.g. active or passive polarized glasses or a passive polarized visor). To conform to the pilot's forward line of sight, the default stereo image produced by the PCVS application 105 may be a forward looking view. To enable similar capabilities gained through an HMD 110, the PCVS application 105 may be slewed in real time, providing the same 360° coverage (without roll) as the HMD 110 configuration. For increased situational awareness, additional views such as exocentric views can be presented in stereo showing a model representation of the ownship in addition to the surroundings (terrain, obstacles, etc.). In some embodiments, the PCVS application 105 may provide outputs that can be merged with the SVS application 103 output or other video imagery such as LWIR (e.g., from the left eye input source 102 and/or the right eye input source 104) to provide a fused 2D or Stereo 3D image with multiple sensors located along the same line of sight (LOS). This can serve to provide an increase in situational awareness over a single source. Coloring can be applied to the point clouds to provide additional data to the user in both a 2D and Stereo 3D image, including: range, intensity (signal strength), obscurant, source (Lidar vs Radar), and/or elevation.

Figure 5:
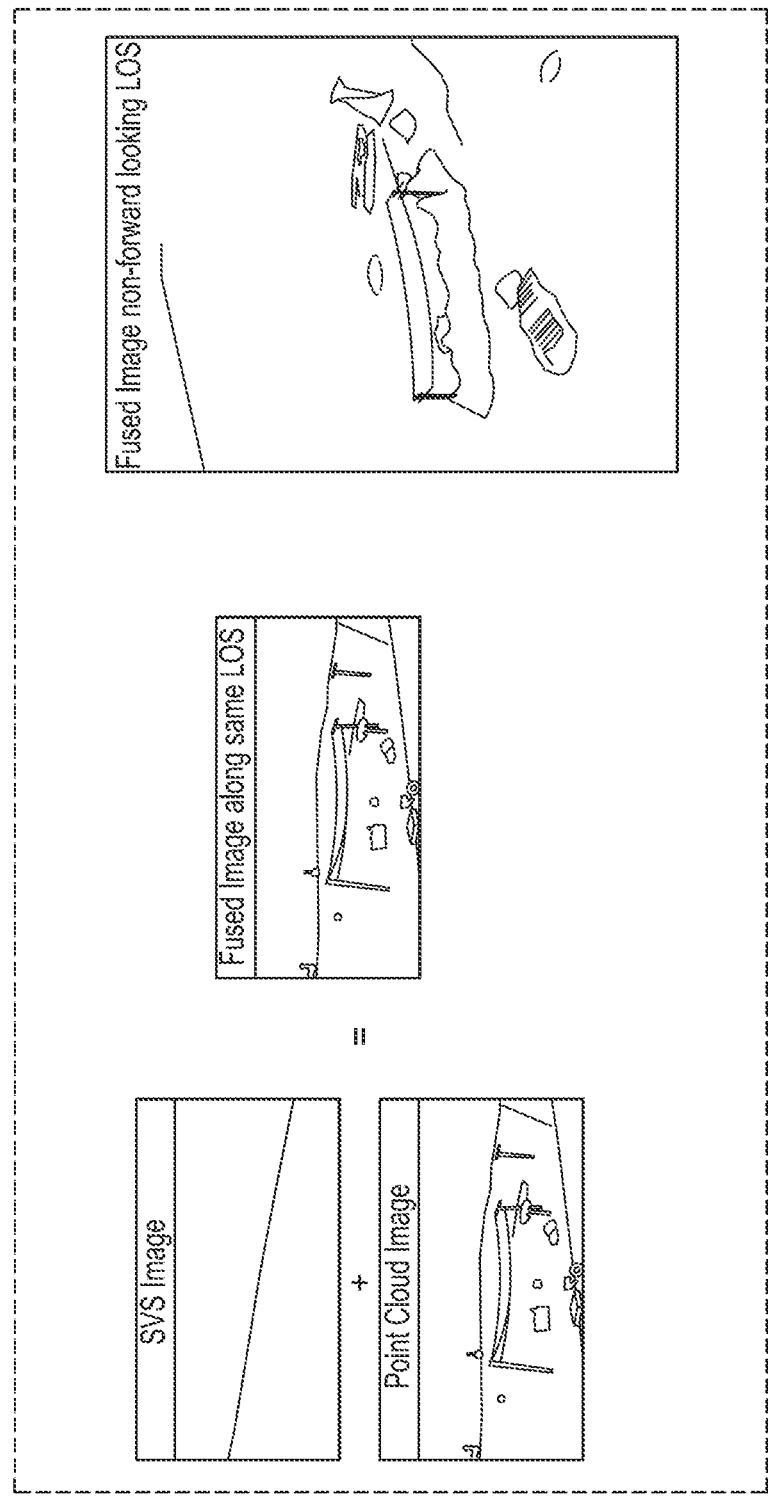
FIG. 5 is an example of a fused image along the same and non-forward looking line of sights provided by an aviation display system according to exemplary embodiments of the inventive concepts disclosed herein.

Referring now to FIG. 5, in some embodiments, a standard view provided by the SVS application 103 may be a fixed forward view based on the pilot's forward line of sight. The camera may be positioned at the pilot's eye point and the aircraft and the camera orientation (Pitch, Roll, and Heading) may be tied to the aircraft attitude. This means the camera will move with the aircraft as it flies and provides a conformal view of the outside world from the perspective of the pilot's viewing angle. Because the SVS application 103 is able to create multiple views with different camera positions, a stereoscopic image can be created by offsetting the camera positions. For example, as shown in FIG. 5, the fused image may be provided along the same LOS, or in a non-forward looking LOS to increase situational awareness. For a transparent HMD 110, the separation between the two cameras can be configurable per user to produce a display conformal to the real-world when flying.

In some embodiments, the processor 106 may be configured to render a 3D point cloud in 3D space using the 3D display 112. The types of data that may be rendered include latitude, longitude, altitude, azimuth, elevation, and range. In some cases, 3D sources may include LADAR, RADAR, the SVS application 103, the PCVS application 105, and/or fused 3D data. In some cases, the processor 106 may utilize color coding for additional information such as strength of signal, source, type of precipitation/object/obscurant, elevation, overlay symbology, as desired (2D or 3D), or adjust the stereo separation dynamically (e.g., with A/C speed). For example, point clouds may be generated via a known database of points (e.g., terrain, obstacles) or by scanning with a sensor (e.g., LADAR, RADAR).

In some embodiments, each of the left eye input source 102 and the right eye input source 104 may include images or video in multi-bands or from multiple sources. For example, the left eye input source 102 may include imagery from the visible light and infrared bands which may be electronically fused together by the processor 106 using known fusion algorithms, such as fractal, pyramid, alpha blend and others, while the right eye input source 104 may include imagery from a RADAR point cloud or LADAR point cloud. The fusion algorithms used by the processor 106 need not be the same for each of the left eye input source 102 and the right eye input source 104. One or more of the HUD 108, the HMD 110, or the 3D display 112 may display each of these fused images in stereo, and the user, (e.g., with the aid of glasses similar to 3D television) may see each of these different channels by only one eye. Each channel may be taken at the same location so as to form a 2D final image or at spatially separate locations to result in a 3D final image provided to the user.

Figure 6A:
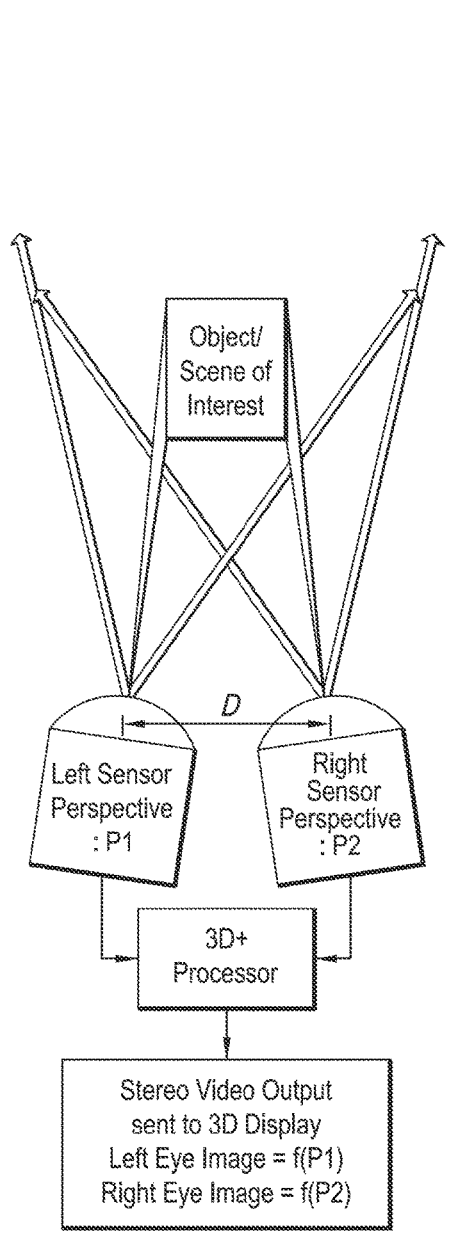
FIGS. 6A-6B show examples of hyperstereo imaging provided by an aviation display system according to exemplary embodiments of the inventive concept disclosed herein.
Figure 6B:
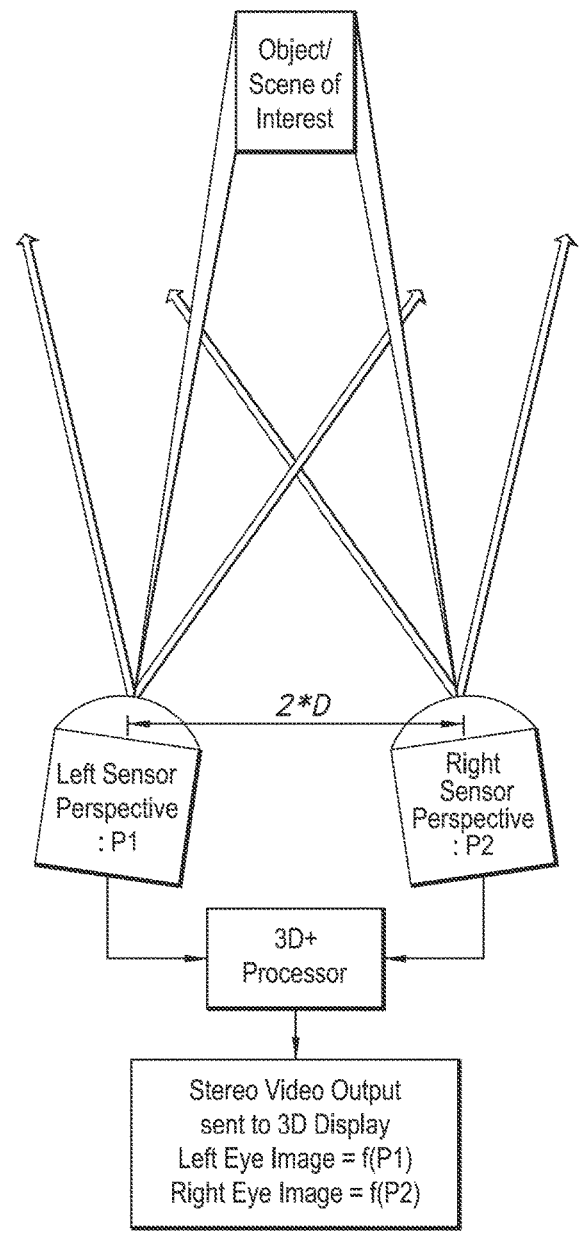

Referring now to FIGS. 6A-6B, in some instances when the pilot is fully immersed in the scene, such as DVE, or when using the 3D display 112, a hyper-stereoscopic/ultra-hyper-stereoscopic image may be presented to the pilot to help provide better depth judgment. A hyperstereo or ultra-hyperstereo image has an extended separation compared to normal stereoscopic images. This provides better depth perception at standard viewing ranges, makes depth perception available at longer ranges, and gives pilots the ability to "see sides" of objects because scene is scaled by the hyper-stereo factor (e.g., 8× hyper-stereo=⅛ scale model). In some instances, a nX hypersterero factor may enable equivalent 3D geometric perspective at nX of a given range, or (1/n)X a nX perspective at the same range. Ultrahyperstereo perspective enhancement may be equivalent to viewing a 1:n scale model, which provides improved 3D depth perception and perspective viewing.

In some embodiments, each of the left eye input source 102 and the right eye input source 104 may display a variable and separate line-of-sight (LOS) projection, such as a Synthetic Vision (SVS) perspective from the SVS application 103. This provides a 3D SVS. Since SVS is computer generated from a database (point cloud data of RADAR, LADAR may be substituted), the eye separation distance, or "camera position", can be changed. For example, standard eye separation (Inter-Pupillary Distance [IPD]) of 2.5" generally matches a typical human eye separation, and this is important when the image is needed to be close to a perspective offered by actual vision. Having an individually adjustable IPD to fit the actual pilot's eye separation may be utilized, especially in some non-immersion HMD 110 applications. Extended separation, hyperstereo or ultrahyperstereo may provide for better depth perception at increased viewing ranges. Additionally, the SVS application 103 camera positions and views can be configured real time which would allow the stereoscopic offsets to be changed by the processor 106 based on phases of flight (takeoff, en-route, landing), speed, altitude, and environmental conditions.

In some embodiments, SVS application 103 left eye view and right eye view may be interlaced by the processor 106 or by the HUD 108 and present to the pilot on the HUD 108. To view the image in stereo the pilot would use active or passive polarized glasses or a passive polarized visor. Because the HUD 108 is transparent and at a fixed location, a stereo image may be presented in a DVE condition. Additionally the HUD 108 is fixed forward and the symbology presented on the HUD 108 is generally conformal to the outside world, a default view the SVS application 103 presented on the HUD 108 may be a forward looking view in some embodiments.

In some embodiments, when combined with head tracker data from the HMD 110, the SVS application 103 can provide 360° coverage to the user. In some embodiments where the HMD 110 has a transparent visor, the HMD 110 can be coupled with embedded eye tracking and the SVS application 103 to allow camera offsets to be updated real-time based on where the pilot is looking. This may provide a continuous stereo image that conforms to the outside world.

Figure 7:
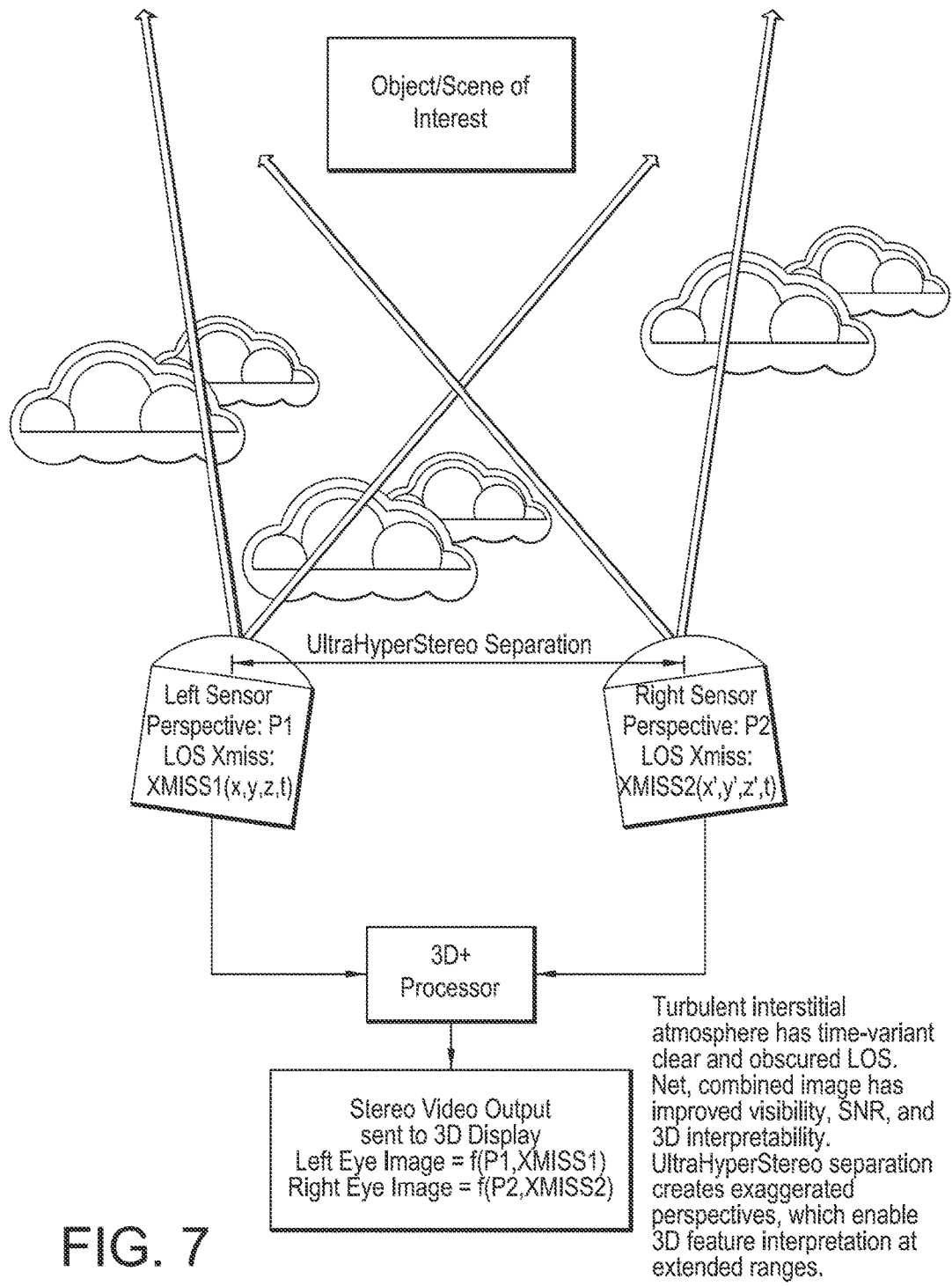
FIG. 7 is a diagram showing increased net visibility in a degraded visual environment (DVE) provided by an aviation display system according to an exemplary embodiment of the inventive concepts disclosed herein.

Referring now to FIG. 7, in some embodiments where the aircraft 101 is operated in, or lands in DVE conditions, the aviation display system 100 may provide increased situational awareness as follows. Dust clouds have time-variant visibility through a given Line-Of-Sight (LOS). Two widely separated LOS paths viewed simultaneously may increase net visibility. One of the LOS paths may be obscured, but the other LOS path may be clear. Use of filtered LWIR may help because of increased dust penetration. Stereo LOS may provide even better penetration; ultrahypersterero geometry may magnify the depth cues and improve side profile viewing under DVE conditions. In some embodiments, the aircraft 101 (e.g., a helicopter) may be landing in a dusty environment or a DVE, and the left-eye input source 102 and the right-eye input source 104 may include widely separated sensors (e.g. long wavelength infra-red (LWIR) sensors). In this instance, each of the left and right eye channel outputs may be separately delivered to each eye, to provide Line-Of-Sight (LOS) paths that would be quite different through the turbulent obscuring atmosphere, and would increase the net visibility when the images from the left eye input source 102 and the right eye input source 104 are fused together in the mind of the pilot. In some embodiments, when the aircraft 101 is determined to be in a DVE, the aviation display system 100 may automatically switch the main exterior view displayed to the pilot to such an ultrahyperstereo display to improve both net visibility and depth perception.

Referring now to FIGS. 8A-8I, some embodiments may include variants such as having one or both of the left eye output and the right eye output channels be RADAR or LADAR (e.g., point cloud) video images, or synthetically rendered environment (e.g., synthetic vision from the SVS application 103), and/or point cloud from the PCVS application 105). Symbology and overlays may be displayed in 3D as well. Variable location (e.g., distance in front of the aircraft 101) of symbology and overlays could be used on one or both of the left eye and right eye channels to give a depth dimension to graphical information.

Figure 8A:
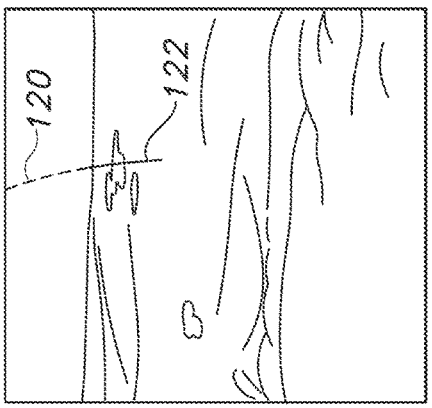
FIGS. 8A-8I show exemplary graphical symbols provided by an aviation display system according to the inventive concepts disclosed herein.
Figure 8B:
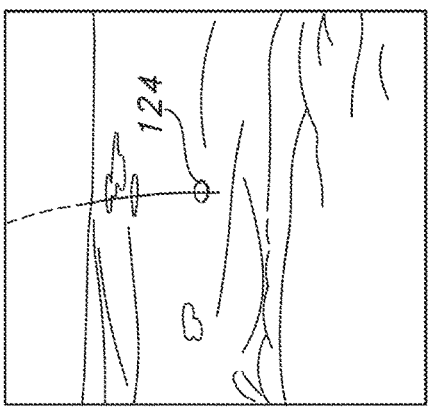
Figure 8C:
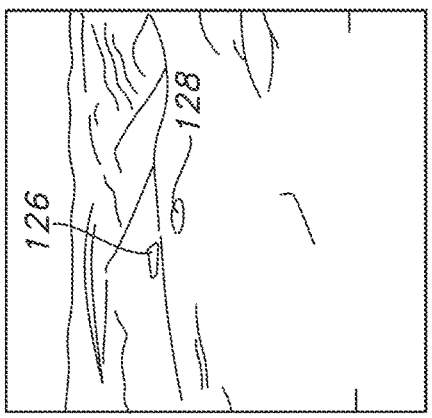
Figure 8D:
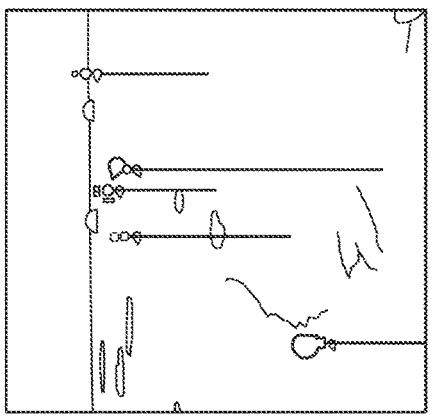
Figure 8E:
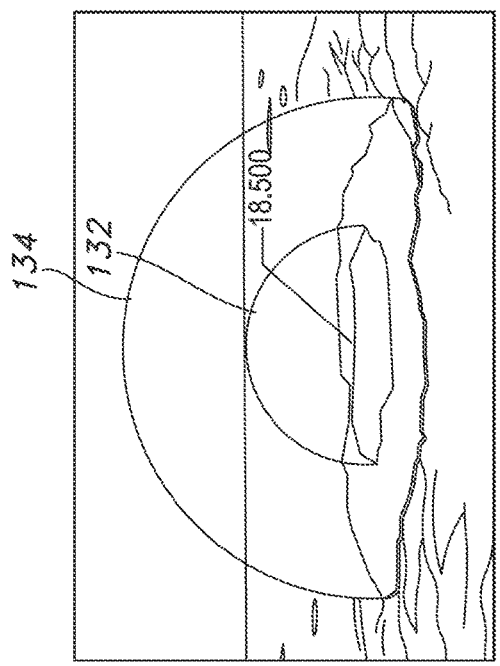
Figure 8F:
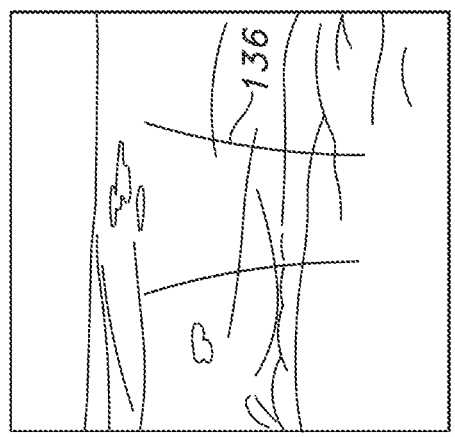
Figure 8G:
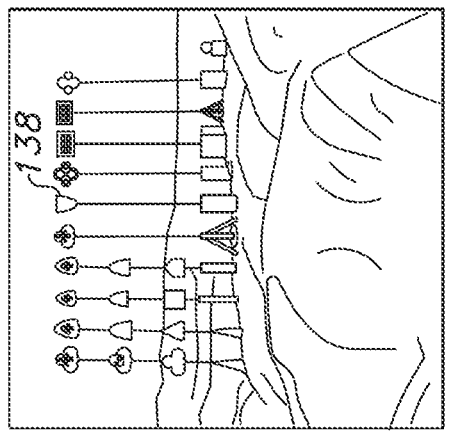

In some cases, 3D weapons cueing/targeting could be provided with continuously computed impact line (COIL) 120 and continuously computed impact point (CCIP) 122 (FIG. 8A), and continuously computed release point (CGRP) 122 (FIG. 8B). Other examples may include hover points 126 and landing zones 128 (FIG. 8C), TCAS traffic 130 (FIG. 8D), threat domes 132 and 134 (FIG. 8E), gun tunnels 136 (FIG. 8F), example ground tracks 138 (FIG. 8G) and may also be displayed in 3D by the aviation display system 100.

Additional examples of graphical symbols generated by the processor 106 and provided to a user by the aviation display system 100 may include dynamically varying the depth of the graphical data in response to severity of alerts and threat levels, velocity, or other factors. For example, as shown in FIG. 8H, graphical indicators or symbols for urgent or more important alerts (e.g., Fuel low graphical symbol 140) may come further forward with increasing urgency or importance, or dynamically pop out of the screen. Additionally, color can be applied to graphical symbols to provide additional data, such as range, intensity (e.g., signal strength), obscurant, source of data, severity, or elevation.

Because the SVS application 103 can create multiple views with different camera positions a stereoscopic image can be created by offsetting the camera positions. Further, depth of items in the stereoscopic image can be changed by adjusting the camera offset and convergence angles. This can be used in conjunction with item size to alert pilots to problematic issues (weapons launch, traffic incursion, cautions/warnings). By having the graphical indicator move from further in the image to closer draws the user's attention to the graphical indicator.

Figure 8I:
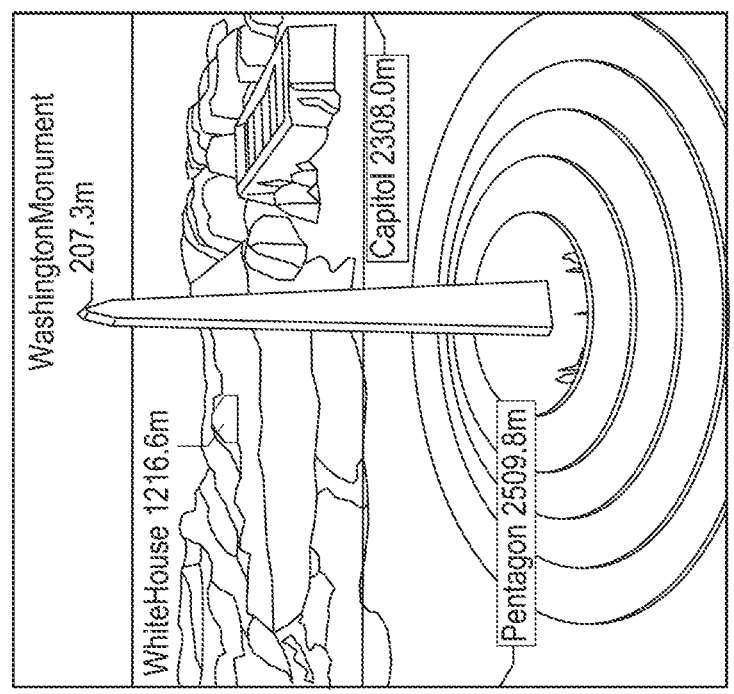
Figure 8H:
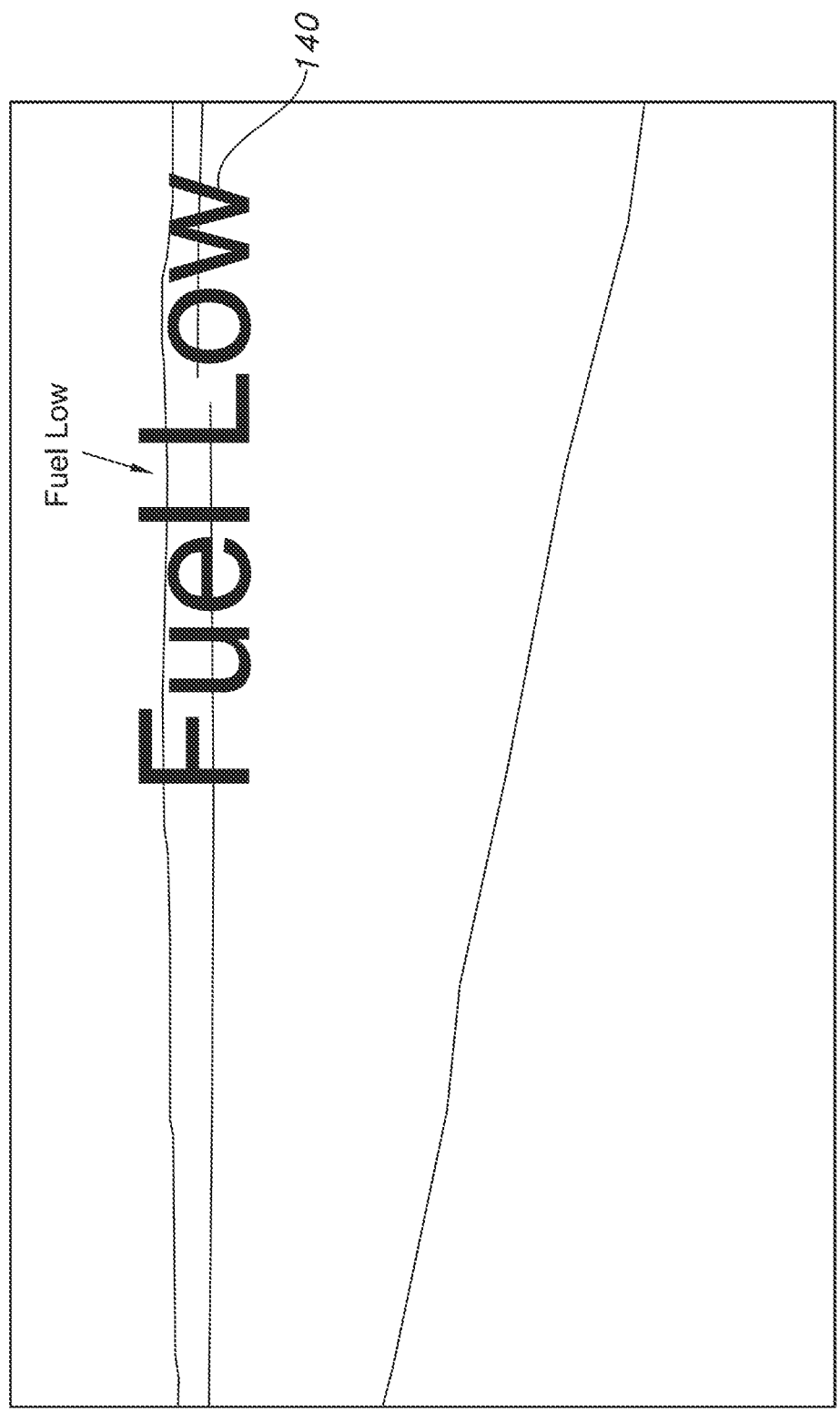

As shown in FIG. 8I, in some embodiments, the processor 106 may be configured to generate or create graphical overlays onto the left eye and/or right eye channels output to provide users with more information and/or more intuitive information. The graphical overlays may be dynamic or static and may be in 2D or 3D. The graphical overlays may include symbology, height cues at proper depth, and may be overlaid on 3D scene at depth of interest. Multiple depths may be used for symbology/overlays, and the depth may correspond to distance of interest (e.g., threat zones, obstacles). In some embodiments, the depth may be proportional to velocity/magnitude.

In some embodiments, the processor 106 of the aviation display system 100 may receive data from passive stereo sensors (e.g., the left eye input source 102 and the right eye input source 104 providing channels from different perspectives) to create two perspectives of the external scene about the aircraft 101 (e.g., Visible/LWIR/MWIR). The processor 106 may use stereo processing to extract 3D scene content and recognize one or more features in the external scene. In some cases, the processor 106 may automatically measure distance/attitude and display appropriate warnings to a user in a pilotage environment, in order to reduce operator workload for obstacle detection in DVE conditions. Further, in some embodiments the processor 106 may transmit data to a remote processor or aircraft to automate an engagement sequence (such as refueling, or auto-landing), enable unmanned aerial system Concept Of Operations (CONOPS) (e.g., automated refueling, rendezvous, maneuvering, takeoff/landing). As will be appreciated by persons of ordinary skill in the art having the benefit of the instant disclosure, using passive sensors may enable the system 100 to operate under emission controlled conditions (EMCON).

In some embodiments, the processor 106 may process data received from the left eye input source 102 and the right eye input source 104 to determine approaching object position relative to the aircraft 101 (e.g., relative to camera(s) platform), and using image processing, may detect an approaching object in a frame. The processor 106 may apply known camera geometry (e.g., field of view, orientation), and may provide a Frame-by-Frame (e.g., 60 Hz) solution continuously output for low latency relative position and flight path prediction.

In some embodiments, image recognition using edge detection or corner detection or similar algorithms may be implemented by the processor 106. Common movement of relative edges/corners of the object relative to the background may make data-reduction algorithms efficient. If the object type is known prior to contact, image recognition becomes even simpler, as the relative geometries are already known. For example, an F-15 aircraft has 2 vertical tails, known leading edge sweep angle, and engine intake lines.

For stereoscopic systems such as the aviation display system 100, the processor 106 may process data from each camera (e.g., from each of the left eye channel input 102 and the right eye channel input 104) to establish object position in each frame of video. Aircraft azimuth/elevation relative to camera boresight may be precise, and distance-from-camera (e.g., z-axis) may be relatively less precise, as it would be based on target size within image, instead of x,y position within the frame. Left eye input and right eye input camera positions for stereo video provide converging boresighted solutions. Left/right camera images provide relative off-z-axis distances, which may be processed by the processor 106 to provide a combined high-accuracy 'z' axis solution. Different video frame analysis may be carried out by the processor 106, providing similar information, suitable for Design Assurance Level (DAL) A requirements. In some cases, a third input source (e.g., a third camera) may provide additional position data to the processor 106 to refine the received object or aircraft position, and to provide a third redundancy solution for safety/verification.

Figure 9:
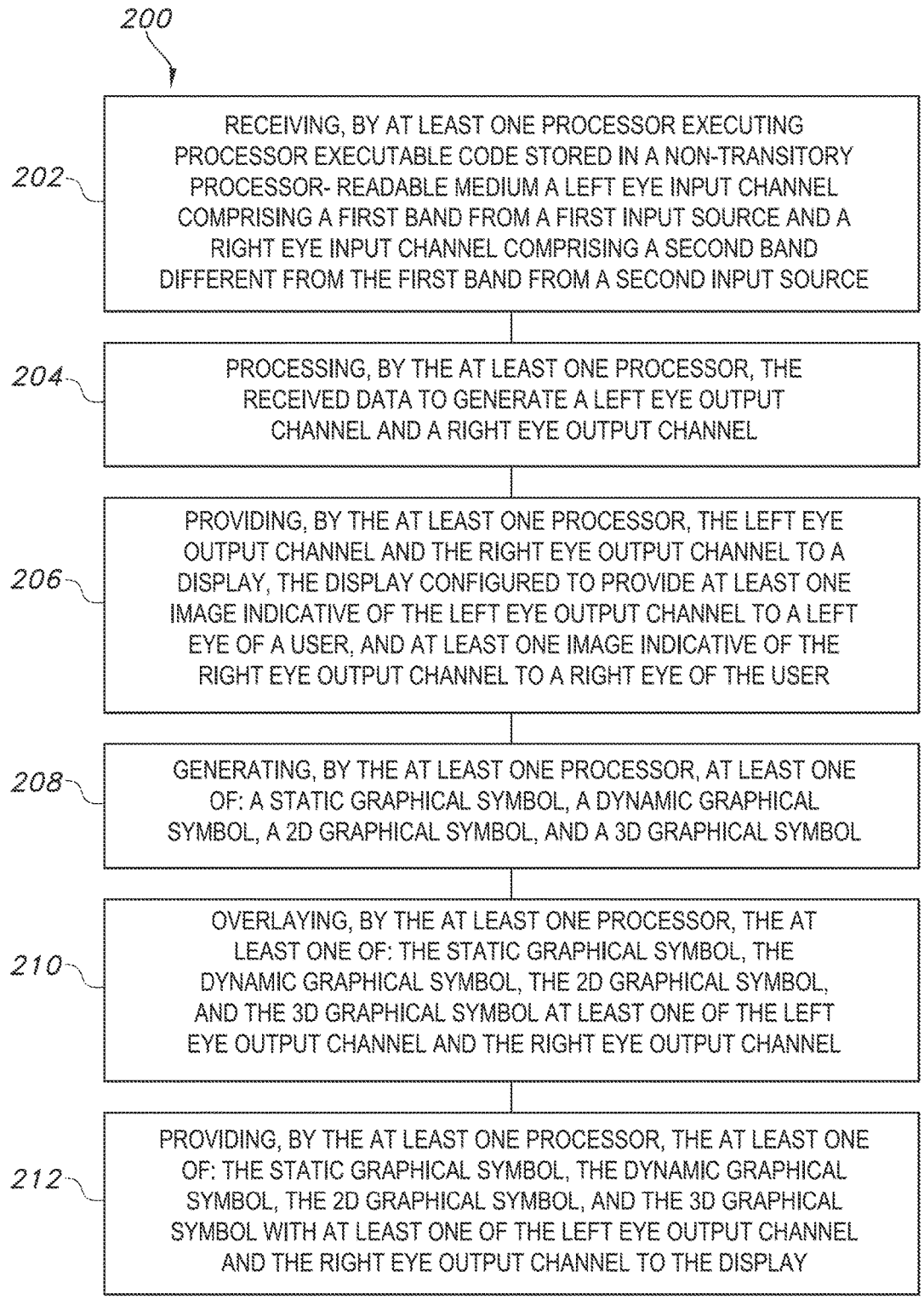
FIG. 9 is a diagram of an exemplary embodiment of a method of displaying information on an aviation display system according to the inventive concepts disclosed herein.

Referring now to FIG. 9, an exemplary embodiment of an aviation information display method 200 according to the inventive concepts disclosed herein is shown.

A step 202 may include receiving, by at least one processor executing processor executable code stored in a non-transitory processor-readable medium a left eye input channel comprising a first band from a first input source and a right eye input channel comprising a second band different from the first band from a second input source.

A step 204 may include processing, by the at least one processor, the received data to generate a left eye output channel and a right eye output channel.

A step 206 may include providing, by the at least one processor, the left eye output channel and the right eye output channel to a display configured to provide at least one image indicative of the left eye output channel to a left eye of a user, and at least one image indicative of the right eye output channel to a right eye of the user. The display may be located on an aircraft.

A step 208 may include generating, by the at least one processor, at least one of: a static graphical symbol, a dynamic graphical symbol, a 2D graphical symbol, and a 3D graphical symbol.

A step 210 may include overlaying, by the at least one processor, at least one of: the static graphical symbol, the dynamic graphical symbol, the 2D graphical symbol, and the 3D graphical symbol at least one of the left eye output channel and the right eye output channel.

Further, a step 212 may include providing, by the at least one processor, at least one of: the static graphical symbol, the dynamic graphical symbol, the 2D graphical symbol, and the 3D graphical symbol with at least one of the left eye output channel and the right eye output channel to the display.

In some embodiments, the method 200 may also include processing, by the at least one processor, the left eye input channel and the right eye input channel to at least one of: recognize at least one feature in the external scene about the aircraft and determine a position of at least one feature in the external scene relative to the aircraft, and providing data indicative of at least one feature in the external scene to at least one of the display and a remote processor. Further, in some embodiments, the method 200 may further include determining, by the at least one processor, an automated engagement sequence for at least one of: automated refueling, automated landing, maneuvering, rendezvous, takeoff, and landing, based on the left eye input channel and the right eye input channel. The automated engagement sequence may be transmitted to a remote processor.

It is to be understood that the method 200 may include one or more of the steps described above, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aviation display system, comprising:
a first input source configured to provide a left eye input channel comprising a first band;
a second input source configured to provide a right eye input channel comprising
a second band different from the first band;
at least one processor coupled with the first and second input channels and with a non-transitory processor readable medium storing processor executable code, which when executed by the at least one processor, causes the at least one processor to:
receive data indicative of the left eye input channel from the first input source and data indicative of the right eye input channel from the second input source;
process the received data to generate a left eye output channel and a right eye output channel;
generate at least one of: a static graphical symbol, a dynamic graphical symbol a 2D graphical symbol, and a 3D graphical symbol;
overlay the at least one of: the static graphical symbol, the dynamic graphical symbol, the 2D graphical symbol, and the 3D graphical symbol at least one of the left eye output channel and the right eye output channel; and
a display coupled with the at least one processor, the display configured to receive the left eye output channel and the right eye output channel from the at least one processor and to provide at least one image indicative of the left eye output channel to a left eye of a user, and at least one image indicative of the right eye output channel to a right eye of the user, wherein the display is further configured to display the at least one of: the static graphical symbol, the dynamic graphical symbol, the 2D graphical symbol, and the 3D graphical symbol to the user.

2. The aviation display system of claim 1, wherein each of the first input source and the second input source comprise one or more of: an ultraviolet camera, a visible light camera, a video camera, an infrared sensor, a live radar, a LAOAR, a synthetic vision application, and a point cloud vision application.

3. The aviation display system of claim 1, wherein the first band and the second band are dissimilar to one another.

4. The aviation display system of claim 3, wherein the left eye input channel and the right eye input channel have the same perspective and wherein the left eye output channel and the right eye output channel are configured so as to be perceived by the user as a 2D image.

5. The aviation display system of claim 1, wherein the left eye input channel further comprises a first perspective and the right eye input channel further comprises a second perspective offset from the first perspective by at least one of a predetermined distance and a predetermined angle, and wherein the left eye output channel and the right eye output channel are configured so as to be perceived by the user as a 3D image.

6. The aviation display system of claim 5, wherein the at least one of the predetermined distance and the predetermined angle are dynamically varied and wherein the left eye output channel and the right eye output channel are configured so as to be perceived by the user as one or more of: a standard eye separation 3D image, a hyperstereo 3D image, and an ultrahyperstereo 3D image.

7. The aviation display system of claim 1, wherein the left eye input channel comprises a first line of sight, the right eye input channel comprises a second line of sight laterally separated from the first line of sight, and wherein at least one of the first band and the second band is a long-wave infrared band, such that the left eye output channel and the right eye output channel are configured to provide increased visibility during degraded visual environment conditions.

8. The aviation display system of claim 1, wherein the display is located on an aircraft.

9. The aviation display system of claim 8, wherein the display comprises one or more of: a heads-up display, a transmissive head-mounted display, an immersive head-mounted display, and a 3D display.

10. The aviation display system of claim 8, wherein the display comprises a head-mounted display including at least one of a head-tracker configured to track a position of user's head and an eye-tracker configured to track the user's eyes.

11. The aviation display system of claim 1, wherein the first band is at least one of: a single band, and a fused combination of two or more bands.

12. The aviation display system of claim 11, wherein the processor executable code when executed by the at least one processor, further causes the at least one processor to process the received data to generate the left eye output channel and the right eye output channel by at least one of: fusing the first band and the second band and interlacing the left eye output channel and the right eye output channel.

13. The aviation display system of claim 1, wherein at least one of the left eye input channel and the right eye input channel comprises at least one of a synthetic view of an external scene and point-cloud data, and wherein the processor executable code when executed by the at least one processor, further causes the at least one processor to process the received data to fuse the synthetic view and the point-cloud data to provide a 3D synthetic vision images to at least one of the left eye output channel and the right eye output channel.

14. The aviation display system of claim 1, wherein the left eye input channel further comprises a first perspective and the right eye input channel further comprises a second perspective offset from the first perspective by a predetermined distance, and wherein the processor executable code when executed by the at least one processor, further causes the at least one processor to:
process the left eye input channel and the right eye input channel to at least one of: recognize at least one feature in the external scene about the aircraft and determine a position of the at least one feature in the external scene relative to the aircraft; and provide data indicative of the at least one feature in the external scene to at least one of the display and a remote processor.

15. An aviation display system, comprising:
a first input source configured to provide a left eye input channel comprising a first band, the left eye input channel further comprises a first perspective;
a second input source configured to provide a right eye input channel comprising a second band different from the first band, the right eye input channel further comprises a second perspective offset from the first perspective by a predetermined distance;
at least one processor coupled with the first and second input channels and with a non-transitory processor readable medium storing processor executable code, which when executed by the at least one processor, causes the at least one processor to:
 receive data indicative of the left eye input channel from the first input source and data indicative of the right eye input channel from the second input source;
 process the received data to generate a left eye output channel and a right eye output channel;
 determine, based on the left eye input channel and the right eye input channel an automated engagement sequence for at least one of: automated refueling, automated landing, maneuvering, rendezvous, takeoff, and landing; and transmit the automated engagement sequence to a remote processor; and
a display coupled with the at least one processor, the display configured to receive the left eye output channel and the right eye output channel from the at least one processor and to provide at least one image indicative of the left eye output channel to a left eye of a user, and at least one image indicative of the right eye output channel to a right eye of the user.

16. A method of displaying information, comprising:
receiving, by at least one processor executing processor executable code stored in a non-transitory processor-readable medium:
 a left eye input channel comprising a first band from a first input source; and
 a right eye input channel comprising a second band different from the first band from a second input source;
processing, by the at least one processor, the received data to generate a left eye output channel and a right eye output channel;
providing, by the at least one processor, the left eye output channel and the right eye output channel to a display configured to provide at least one image indicative of the left eye output channel to a left eye of a user, and at least one image indicative of the right eye output channel to a right eye of the user;
generating, by the at least one processor, at least one of: a static graphical symbol, a dynamic graphical symbol, a 2D graphical symbol, and a 3D graphical symbol;
overlaying, by the at least one processor, the at least one of: the static graphical symbol, the dynamic graphical symbol, the 20 graphical symbol, and the 30 graphical symbol at least one of the left eye output channel and the right eye output channel output; and
providing, by the at least one processor, the at least one of: the static graphical symbol, the dynamic graphical symbol, the 20 graphical symbol, and the 3D graphical symbol with at least one of the left eye output channel and the right eye output channel to the display.

17. The method of claim 16, further comprising:
processing, by the at least one processor, the left eye input channel and the right eye input channel to at least one of: recognize at least one feature in the external scene about the aircraft and determine a position of the at least one feature in the external scene relative to the aircraft; and
providing, by the at least one processor, data indicative of the at least one feature in the external scene to at least one of the display and a remote processor.

18. A method of displaying information, comprising:
receiving, by at least one processor executing processor executable code stored in a non-transitory processor-readable medium:
 a left eye input channel comprising a first band from a first input source; and
 a right eye input channel comprising a second band different from the first band from a second input source;
processing, by the at least one processor, the received data to generate a left eye output channel and a right eye output channel;
providing, by the at least one processor, the left eye output channel and the right eye output channel to a display configured to provide at least one image indicative of the left eye output channel to a left eye of a user, and at least one image indicative of the right eye output channel to a right eye of the user;
determining, by the at least one processor, an automated engagement sequence for at least one of: automated refueling, automated landing, maneuvering, rendezvous, takeoff, and landing, based on the left eye input channel and the right eye input channel; and
transmitting, by the at least one processor, the automated engagement sequence to a remote processor.

* * * * *